(12) United States Patent
Ping et al.

(10) Patent No.: US 10,880,008 B2
(45) Date of Patent: Dec. 29, 2020

(54) DOWNSTREAM NODE SETUP

(71) Applicant: Cisco Technology, Inc., San Jose, CA (US)

(72) Inventors: Huang Ping, Shanghai (CN); John Alexander Ritchie, Jr., Duluth, GA (US)

(73) Assignee: CISCO TECHNOLOGY, INC, San Jose, CA (US)

( * ) Notice: Subject to any disclaimer, the term of this patent is extended or adjusted under 35 U.S.C. 154(b) by 0 days.

(21) Appl. No.: 16/818,353

(22) Filed: Mar. 13, 2020

(65) Prior Publication Data

US 2020/0220622 A1    Jul. 9, 2020

Related U.S. Application Data

(62) Division of application No. 16/249,342, filed on Jan. 16, 2019, now Pat. No. 10,594,399, which is a division of application No. 15/587,449, filed on May 5, 2017, now Pat. No. 10,187,149.

(51) Int. Cl.
| | | |
|---|---|---|
| H04B 10/07 | (2013.01) | |
| H04B 10/25 | (2013.01) | |
| H04B 10/27 | (2013.01) | |
| H04B 10/079 | (2013.01) | |
| H04B 10/2575 | (2013.01) | |
| H04B 10/69 | (2013.01) | |

(52) U.S. Cl.
CPC ... *H04B 10/25891* (2020.05); *H04B 10/0795* (2013.01); *H04B 10/25751* (2013.01); *H04B 10/27* (2013.01); *H04B 10/07* (2013.01); *H04B 10/69* (2013.01); *H04B 10/6931* (2013.01); *H04B 10/6971* (2013.01)

(58) Field of Classification Search
CPC .......... H04B 10/2504; H04B 10/25751; H04B 10/27; H04B 10/0795; H04B 10/07; H04B 10/25891; H04B 10/6931; H04B 10/69; H04B 10/6971
USPC ....................................... 398/9–38, 202–214
See application file for complete search history.

(56) References Cited

U.S. PATENT DOCUMENTS

| | | | |
|---|---|---|---|
| 4,736,391 A | 4/1988 | Siegel | |
| 5,109,286 A | 4/1992 | West, Jr. | |
| 5,146,079 A | 9/1992 | Lisco | |
| 5,208,854 A * | 5/1993 | West, Jr. | ............... H04K 3/42 |
| | | | 348/E7.052 |

(Continued)

OTHER PUBLICATIONS

Field Operations Technician Training Guide, "Operation and Design of the HFC Network," PS # 10348, TG Rev.1.0 053105, 38 pgs.

*Primary Examiner* — Dibson J Sanchez
(74) *Attorney, Agent, or Firm* — Merchant & Gould P.C.

(57) ABSTRACT

Per-port performance optimization may be provided. First, performance data may be received corresponding to each of a plurality of ports. Then it may be determined that performance of at least one of the plurality of ports can be improved based on the received performance data corresponding to the least one of the plurality of ports. Next, in response to determining that the performance of the at least one of the plurality of ports can be improved, at least one of a plurality of components may be adjusted corresponding to the at least one of the plurality of ports to improve performance of the least one of the plurality of ports.

17 Claims, 6 Drawing Sheets

(56) References Cited

U.S. PATENT DOCUMENTS

| | | | |
|---|---|---|---|
| 5,231,660 A | 7/1993 | West, Jr. | |
| 5,267,071 A | 11/1993 | Little | |
| 5,430,568 A | 7/1995 | Little | |
| 5,500,758 A | 3/1996 | Thompson | |
| 5,515,008 A * | 5/1996 | Ueda | H03G 3/3052 |
| | | | 330/144 |
| 5,523,875 A | 6/1996 | Morris | |
| 5,854,971 A * | 12/1998 | Nagoya | H03G 3/3047 |
| | | | 455/126 |
| 5,907,422 A * | 5/1999 | Ho | H04B 10/6931 |
| | | | 250/214 A |
| 6,047,159 A * | 4/2000 | Powell | H04N 7/22 |
| | | | 398/1 |
| 6,226,114 B1 | 5/2001 | Ashkeboussi | |
| 6,297,709 B1 * | 10/2001 | Wey | H03G 1/0058 |
| | | | 333/17.1 |
| 6,418,301 B1 * | 7/2002 | Le | H03F 1/30 |
| | | | 330/278 |
| 6,449,071 B1 * | 9/2002 | Farhan | H04B 10/504 |
| | | | 398/79 |
| 6,751,803 B1 | 6/2004 | Matsuura | |
| 6,836,184 B1 * | 12/2004 | Daughtry | H03G 3/3042 |
| | | | 330/144 |
| 8,594,118 B2 | 11/2013 | Cooper et al. | |
| 9,160,447 B1 | 10/2015 | Pillai et al. | |
| 9,647,753 B1 * | 5/2017 | Kurisu | H04B 10/07957 |
| 9,819,369 B2 | 11/2017 | Li | |
| 2001/0035994 A1 | 11/2001 | Agazzi | |
| 2003/0007220 A1 * | 1/2003 | Whittlesey | H04Q 11/0067 |
| | | | 398/166 |
| 2003/0152116 A1 | 8/2003 | Liao | |
| 2003/0179040 A1 * | 9/2003 | Kossor | H03G 3/3042 |
| | | | 330/136 |
| 2004/0208652 A1 | 10/2004 | Nagatomo | |
| 2004/0240042 A1 * | 12/2004 | Charlet | H04B 10/2941 |
| | | | 359/337 |
| 2005/0025504 A1 | 2/2005 | Huang | |
| 2005/0130595 A1 * | 6/2005 | Shurvinton | H03G 3/3047 |
| | | | 455/67.11 |
| 2006/0067698 A1 * | 3/2006 | Chan | H04B 10/25751 |
| | | | 398/141 |
| 2006/0160506 A1 | 7/2006 | Smentek | |
| 2007/0042736 A1 * | 2/2007 | Tateno | H03G 3/3052 |
| | | | 455/234.1 |
| 2008/0313696 A1 * | 12/2008 | Blumenkranz | H04B 3/14 |
| | | | 725/149 |
| 2012/0033973 A1 | 2/2012 | Trojer | |
| 2012/0141122 A1 * | 6/2012 | Carusone | H04B 10/6971 |
| | | | 398/37 |
| 2012/0206214 A1 * | 8/2012 | Wang | H04L 7/0087 |
| | | | 333/32 |
| 2013/0125194 A1 | 5/2013 | Finkelstein et al. | |
| 2013/0160068 A1 | 6/2013 | Pradezynski | |
| 2014/0282801 A1 * | 9/2014 | Bowler | H04N 21/2365 |
| | | | 725/129 |
| 2015/0295648 A1 | 10/2015 | Mutalik | |
| 2016/0020742 A1 * | 1/2016 | Maynard | H03G 3/3042 |
| | | | 375/345 |
| 2017/0019175 A1 | 1/2017 | Ling | |
| 2019/0028068 A1 * | 1/2019 | Schemmann | H03F 1/327 |
| 2019/0280665 A1 * | 9/2019 | Nonomura | H03F 3/189 |
| 2019/0349655 A1 * | 11/2019 | Fu | H04B 10/6931 |

* cited by examiner

DOWNSTREAM NODE SETUP

RELATED APPLICATION

This application is a Division of U.S. patent application Ser. No. 16/249,342 entitled "Downstream Node Setup" filed Jan. 16, 2019, which will issue as U.S. Pat. No. 10,594,399 on Mar. 17, 2020, which is a Division of U.S. patent application Ser. No. 15/587,449 entitled "Downstream Node Setup" filed May 5, 2017, now U.S. Pat. No. 10,187,149, all of which are incorporated herein by reference.

TECHNICAL FIELD

The present disclosure relates generally to downstream node setup.

BACKGROUND

A Hybrid Fiber-Coaxial (HFC) network is a broadband network that combines optical fiber and coaxial cable. It has been commonly employed globally by cable television operators. In a hybrid fiber-coaxial cable network, television channels are sent from a cable system's distribution facility to local communities through optical fiber trunk lines. At the local community, a box translates the signal from a light beam to electrical signal, and sends it over cable lines for distribution to subscriber residences. The optical fiber trunk lines provide adequate bandwidth to allow future expansion and new bandwidth-intensive services.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
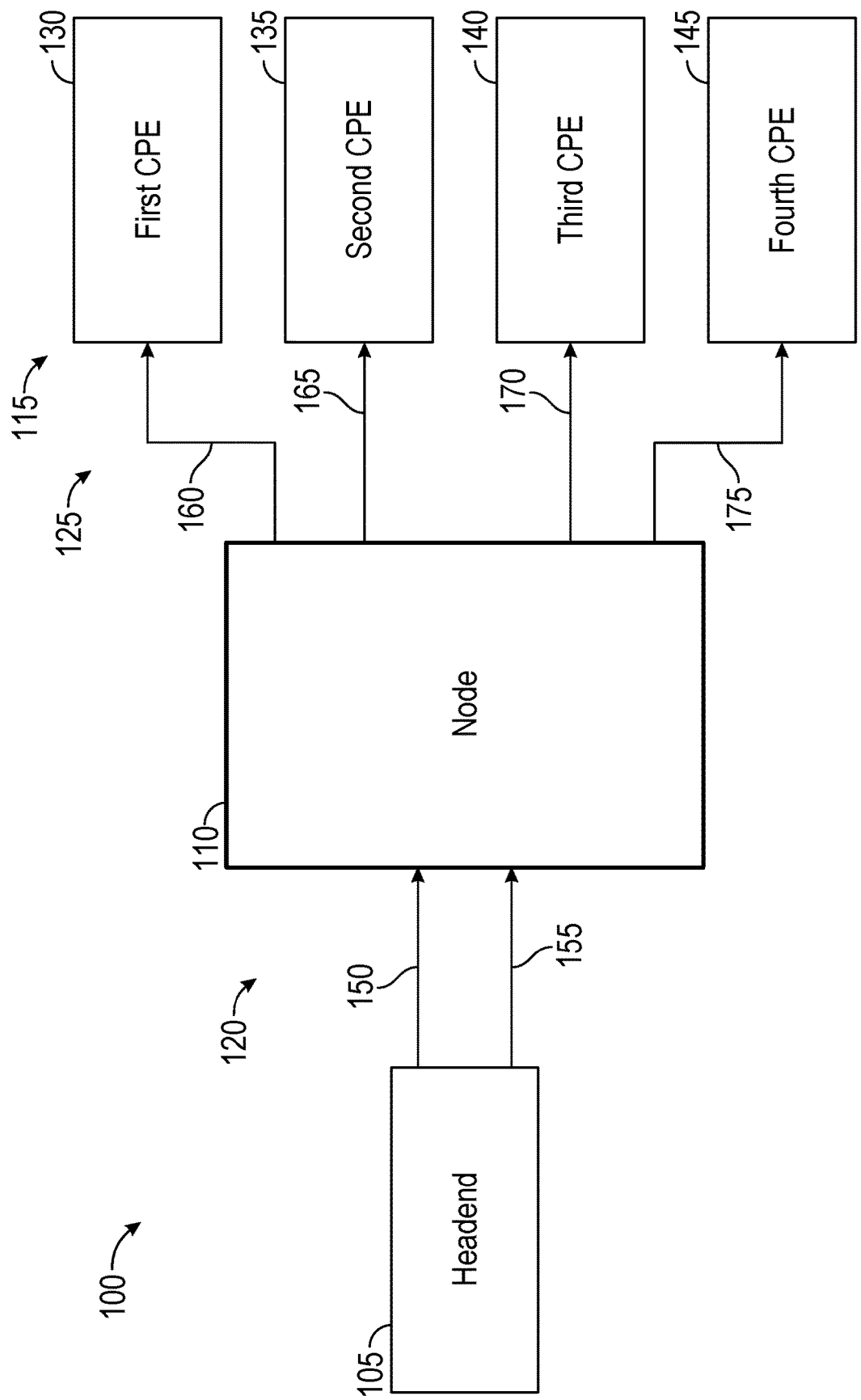
FIG. 1 is a block diagram of a communication system.

Per-port performance optimization may be provided. First, performance data may be received corresponding to each of a plurality of ports. Then it may be determined that performance of at least one of the plurality of ports can be improved based on the received performance data corresponding to the least one of the plurality of ports. Next, in response to determining that the performance of the at least one of the plurality of ports can be improved, at least one of a plurality of components may be adjusted corresponding to the at least one of the plurality of ports to improve performance of the least one of the plurality of ports.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

EXAMPLE EMBODIMENTS

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Multiple-system operators (MSOs) are operators of multiple cable or direct-broadcast satellite television systems. Fiber deep (FD) is a trend in which MSOs push fiber ever closer to customers to provide them with better service. As opposed to an amplifier, a Hybrid Fiber Coaxial (HFC) node may receive signals from a headend via fiber optic cable rather than via coaxial cable for example. In order to provide FD, many HFC nodes may be deployed onto an FD network. Having an auto setup capability when deploying these nodes may help with deployment in a cost-effective and timely manner.

Consistent with embodiments of the disclosure, auto setup may comprise, but is not limited to, input level alignment, per-port performance optimization, per-port power savings, and thermal compensation. Input level alignment may comprise, within a node, getting a constant input level to a forward launch amplifier over the scenarios of an analog receiver (e.g., analog Rx) installed only, a remote physical layer circuit (e.g., remote PHY) installed only, and an overlay scenario in which with both the analog receiver and the remote physical layer circuit are installed. Per-port performance optimization may capture channel performance data in terms of the levels of each channel that may be used, for example, for calculating tilt and composite power for the output level and tilt setup and the power saving usages on a per-port basis for a node. Thermal Compensation may detect the temperature inside a node, query a lookup table for a thermal compensation (e.g., LUT_TC) and then use an electronically controlled attenuator and equalizer to get a relevantly constant output level over the temperature changes. These temperature changes can be annual or diurnal for example.

FIG. 1 is a block diagram of a communication system 100. As shown in FIG. 1, communication system 100 may comprise a headend 105, a node 110, a plurality of customer premises equipment 115, a plurality of headend communication lines 120, and a plurality of node communication lines 125. Headend 105 may comprise, but is not limited to, a cable television headend that may comprise a master facility for receiving television signals for processing and distribution over a cable television system. Node 110 may receive downstream signals from headend 105 via fiber optic cable (e.g., headend communication lines 120) rather than via coaxial cable for example.

Plurality of customer premises equipment 115 may comprise, for example, any terminal and associated equipment located at a subscriber's premises and connected with a carrier's telecommunication channel at a demarcation point. Plurality of customer premises equipment 115 may comprise a first customer premises equipment 130, a second customer premises equipment 135, a third customer premises equipment 140, and a fourth customer premises equipment 145. Ones of plurality of customer premises equipment 115, may comprise, but are not limited to, a cellular base station, a tablet device, a mobile device, a smart phone, a telephone, a remote control device, a set-top box, a digital video recorder, a cable modem, a personal computer, a network computer, a mainframe, a router, or other similar microcomputer-based device.

Plurality of headend communication lines 120 may comprise a first headend communication line 150 and a second headend communication line 155. Headend communication lines 120 may comprise optical fibers. Plurality of node communication lines 125 may comprise a first node communication line 160, a second node communication line 165, a third node communication line 170, and a fourth node communication line 175. Plurality of node communication lines 125 may comprise coaxial cables of varying lengths. While FIG. 1 shows each one of plurality of node communication lines 125 as serving one customer premises equipment, each one of plurality of node communication lines 125 may serve many customer premises equipment locations and is not limited to one.

Figure 2:
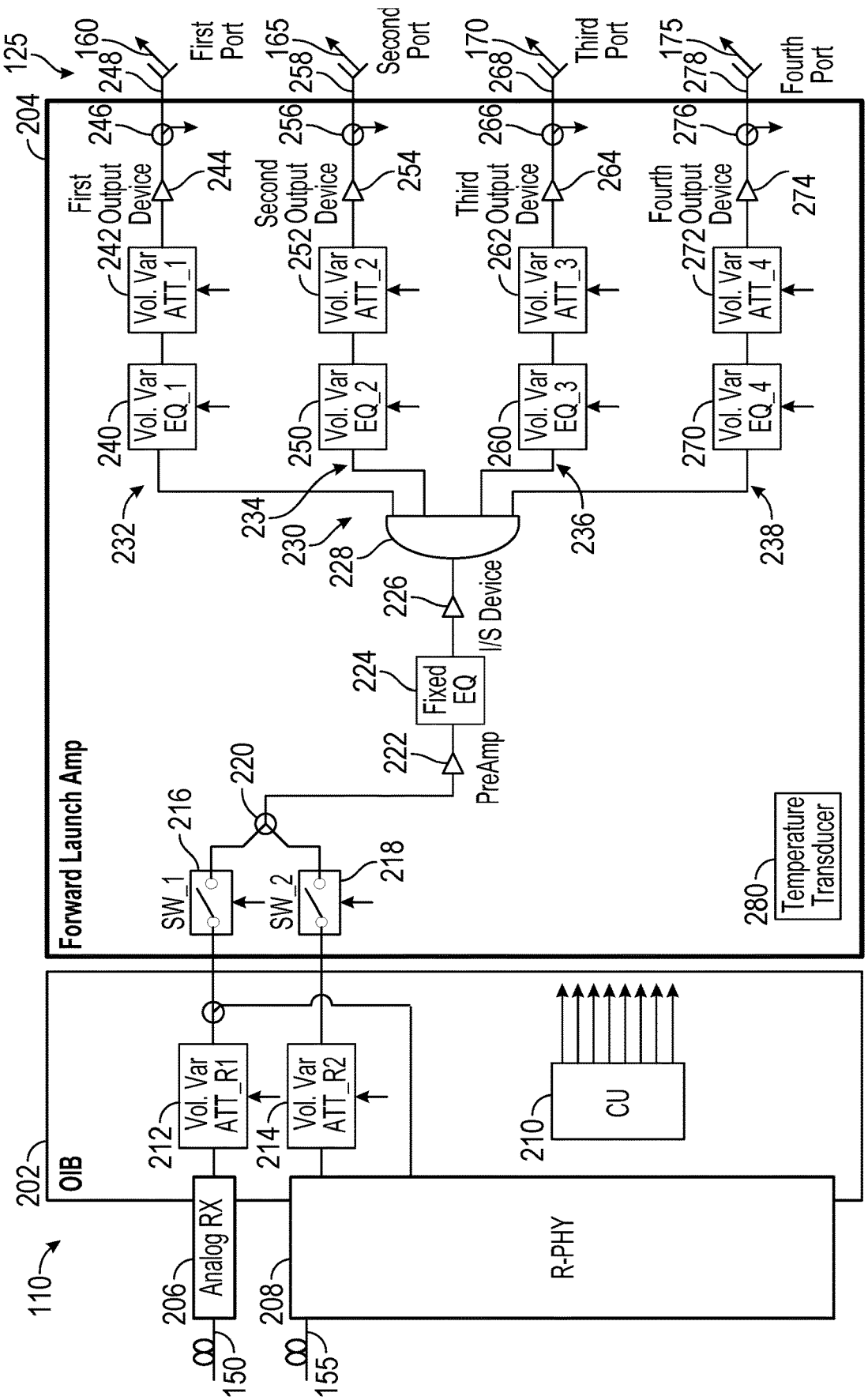
FIG. 2 is a block diagram of a node.

FIG. 2 is a block diagram of node 110. As shown in FIG. 2, node 110 may comprise an optical interface board 202 and a forward launch amplifier 204. Optical interface board 202 may comprise an analog receiver 206, a remote physical layer circuit 208, and a control unit 210. Analog receiver 206 may feed an analog receiver voltage variable attenuator 212 and remote physical layer circuit 208 may feed a remote physical layer circuit voltage variable attenuator 214. Analog receiver voltage variable attenuator 212 and remote physical layer circuit voltage variable attenuator 214 may be used to control the level (e.g., amplitude) of their respective input signals. Analog receiver voltage variable attenuator 212 and remote physical layer circuit voltage variable attenuator 214 may be controlled by control unit 210. Control unit 210 may comprise a computing device as described in more detail below with respect to FIG. 6. While FIG. 2 shows control unit 210 as being disposed in node 110, in other embodiments, control unit 210 may located remote from node 110, for example, on the Cloud. Furthermore, when located at node 110, control unit 210 may be located in optical interface board 202 or in forward launch amplifier 204.

First headend communication line 150 may provide analog receiver 206 with an analog optical signal from headend 105. Analog receiver 206 may convert the received analog optical signal to an electrical signal and then feed this electrical signal to analog receiver voltage variable attenuator 212. Second headend communication line 155 may provide remote physical layer circuit 208 with a digital optical signal from headend 105. Remote physical layer circuit 208 may convert the received digital optical signal into an analog electrical signal and feed this signal to remote physical layer circuit voltage variable attenuator 214.

Embodiments of the disclosure shown in FIG. 2 may be considered an overlay of an analog receiver and a remote physical layer circuit. Other embodiments may be similar to the embodiments shown in FIG. 2, but without remote physical layer circuit 208 (i.e., analog RX only). Also, other embodiments of the disclosure may be similar to the embodiments shown in FIG. 2, but without analog receiver 206 (i.e., remote PHY only).

Forward launch amplifier 204 may comprise a first switch 216, a second switch 218, a combiner 220, a preamplifier 222, a fixed equalizer 224, an interstage device 226, a splitter 228, and a plurality of branches 230. When closed, first switch 216 may provide combiner 220 with the signal from analog receiver voltage variable attenuator 212. Similarly, when closed, second switch 218 may provide combiner 220 with the signal from remote physical layer circuit voltage variable attenuator 214.

Combiner 220 may combine any received signals from first switch 216 and second switch 218 and then feed this combined signal in to preamplifier 222. Fixed equalizer 224 may receive the signal from preamplifier 222, suppress the amplitude of lower frequencies, and fed the signal to interstage device 226. Interstage device 226 may add "gain" (e.g., as much as 20 dB) to the signal and pass the signal onto splitter 228. Plurality of node communication lines 125 may comprise coaxial cables that may attenuate higher frequencies. Interstage device 226 may add "gain" to the signal in order to provide a substantially equal gain across all frequencies. Fixed equalizer 224 may add "tilt" to compensate for the attenuation that may be caused by plurality of node communication lines 125 (e.g., coaxial cables).

Splitter 228 that may pass the signal onto plurality of branches 230. Plurality of branches 230 may comprise a first branch 232, a second branch 234, a third branch 236, and a fourth branch 238. While FIG. 2 shows plurality of branches 230 comprising four branches, embodiments of the disclosure are not limited to four and may comprise any number of branches.

First branch 232 may comprise a first branch voltage variable equalizer 240, a first branch voltage variable attenuator 242, a first branch output device 244, a first branch directional coupler 246, and a first port 248. Under the control of control unit 210, first branch voltage variable equalizer 240 may adjust the tilt of the signal on first branch 232. Similarly, under the control of control unit 210, first branch voltage variable attenuator 242 may adjust the level (e.g., amplitude) of the signal on first branch 232 across all frequencies. First branch output device 244 may amplify the signal from first branch 232 as it comes out of first branch voltage variable attenuator 242 on its way to first port 248.

Control unit 210 may control first branch voltage variable equalizer 240 and first branch voltage variable attenuator 242 based on feedback from first branch directional coupler 246. First branch directional coupler 246 may provide control unit 210 with a sample of the signal from first branch 232 that is output to first port 248. The signal from first output on port 248 may be carried by first node communication line 160 to first customer premises equipment 130. A sample of the signal provided at first customer premises equipment 130 may be provided to control unit 210 that may control first branch voltage variable equalizer 240 and first branch voltage variable attenuator 242 based on the feedback provided from first customer premises equipment 130.

Second branch 234 may comprise a second branch voltage variable equalizer 250, a second branch voltage variable attenuator 252, a second branch output device 254, a second branch directional coupler 256, and a second port 258. Under the control of control unit 210, second branch voltage variable equalizer 250 may adjust the tilt of the signal on second branch 234. Similarly, under the control of control unit 210, second branch voltage variable attenuator 252 may adjust the level (e.g., amplitude) of the signal on second branch 234 across all frequencies. Second branch output device 254 may amplify the signal from second branch 234 as it comes out of second branch voltage variable attenuator 252 on its way to second port 258.

Control unit 210 may control second branch voltage variable equalizer 250 and second branch voltage variable attenuator 252 based on feedback from second branch directional coupler 256. Second branch directional coupler 256 may provide control unit 210 with a sample of the signal from second branch 234 that is output to second port 258. The signal from second output on port 258 may be carried by second node communication line 165 to second customer premises equipment 135. A sample of the signal provided at second customer premises equipment 135 may be provided to control unit 210 that may control second branch voltage variable equalizer 250 and second branch voltage variable attenuator 252 based on the feedback provided from second customer premises equipment 135.

Third branch 236 may comprise a third branch voltage variable equalizer 260, a third branch voltage variable attenuator 262, a third branch output device 264, a third branch directional coupler 266, and a third port 268. Under the control of control unit 210, third branch voltage variable equalizer 260 may adjust the tilt of the signal on third branch 236. Similarly, under the control of control unit 210, third branch voltage variable attenuator 262 may adjust the level (e.g., amplitude) of the signal on third branch 236 across all frequencies. Third branch output device 264 may amplify the signal from third branch 236 as it comes out of third branch voltage variable attenuator 262 on its way to third port 268.

Control unit 210 may control third branch voltage variable equalizer 260 and third branch voltage variable attenuator 262 based on feedback from third branch directional coupler 266. Third branch directional coupler 266 may provide control unit 210 with a sample of the signal from third branch 236 that is output to third port 268. The signal from third output on port 268 may be carried by third node communication line 170 to third customer premises equipment 140. A sample of the signal provided at third customer premises equipment 140 may be provided to control unit 210 that may control third branch voltage variable equalizer 260 and third branch voltage variable attenuator 262 based on the feedback provided from third customer premises equipment 140.

Fourth branch 238 may comprise a fourth branch voltage variable equalizer 270, a fourth branch voltage variable attenuator 272, a fourth branch output device 274, a fourth branch directional coupler 276, and a fourth port 278. Under the control of control unit 210, fourth branch voltage variable equalizer 270 may adjust the tilt of the signal on fourth branch 238. Similarly, under the control of control unit 210, fourth branch voltage variable attenuator 272 may adjust the level (e.g., amplitude) of the signal on fourth branch 238 across all frequencies. Fourth branch output device 274 may amplify the signal from fourth branch 238 as it comes out of fourth branch voltage variable attenuator 272 on its way to fourth port 278.

Control unit 210 may control fourth branch voltage variable equalizer 270 and fourth branch voltage variable attenuator 272 based on feedback from fourth branch directional coupler 276. Fourth branch directional coupler 276 may provide control unit 210 with a sample of the signal from fourth branch 238 that is output to fourth port 278. The signal from fourth output on port 278 may be carried by fourth node communication line 175 to fourth customer premises equipment 145. A sample of the signal provided at fourth customer premises equipment 145 may be provided to control unit 210 that may control fourth branch voltage variable equalizer 270 and fourth branch voltage variable attenuator 272 based on the feedback provided from fourth customer premises equipment 145.

Collectively, first port 248, second port 258, third port 268, and fourth port 278 may comprise the plurality of ports. Furthermore, node 110 may comprise a temperature transducer 280 that my provide control unit 210 with the ambient temperature inside node 110.

Embodiments of the disclosure may include measurement devices comprising, but not limited to, an electronic spectrum measurement device. The electronic spectrum measurement device may pick up the monitoring signals from first branch directional coupler 246, second branch directional coupler 256, third branch directional coupler 266, and fourth branch directional coupler 276. The electronic spectrum measurement device may perform a spectrum capture and provide it to control unit 210. Consistent with embodiments of the disclosure, the functionality of electronic spectrum measurement device may be incorporated into control unit 210. Similarly, measurement devices for obtaining modulation error ratio (MER) and/or bit error rate (BER) measurements may be included in embodiments of the disclosure. These measurements may be provided to control unit 210. Measurement devices for obtaining MER and BER measurements may be incorporated into control unit 210 as well. Accordingly, embodiments of the disclosure may control RF (levels and tilts) and power dissipation (amplifier biasing and linearity) of HFC nodes based on internally located test functionality and customer premise monitoring capability.

Figure 3:
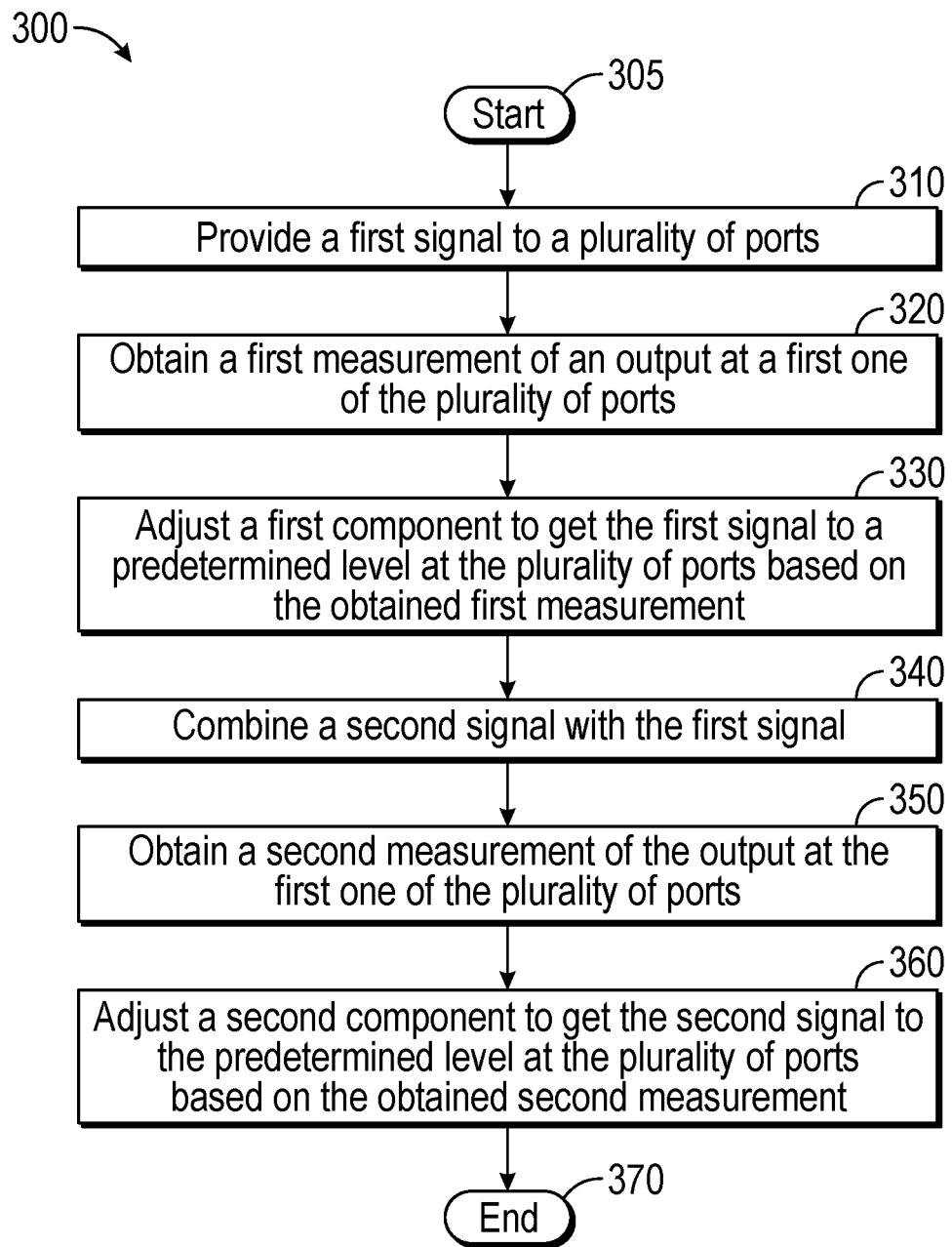
FIG. 3 is a flow chart of a method for providing input level alignment.

FIG. 3 is a flow chart setting forth the general stages involved in a method 300 consistent with embodiments of the disclosure for providing input level alignment. Method 300 may be implemented using node 110 as described in more detail above with respect to FIG. 2. Ways to implement the stages of method 300 will be described in greater detail below.

Method 300 may begin at starting block 305 and proceed to stage 310 where node 110 may provide a first signal to the plurality of ports. For example, first headend communication line 150 may provide analog receiver 206 with an analog optical signal from headend 105. Analog receiver 206 may convert the received analog optical signal to an electrical signal and then feed this electrical signal to analog receiver voltage variable attenuator 212. With first switch 216 in the closed position, this first signal may be distributed to plurality of branches 230 via splitter 228 and be provided to the plurality of ports (e.g., first port 248, second port 258, third port 268, and fourth port 278).

From stage 310, where node 110 provides the first signal to the plurality of ports, method 300 may advance to stage 320 where control unit 210 may obtain a first measurement of an output at a first one of the plurality of ports. For example, first branch directional coupler 246 (or any of the branch directional couplers) may sample the output and send this sample to control unit 210. In this way, control unit 210 may be provided with a level value of the first signal.

Once control unit 210 obtains the first measurement of the output at the first one of the plurality of ports in stage 320, method 300 may continue to stage 330 where control unit 210 may adjust a first component to get the first signal to a predetermined level at the plurality of ports based on the obtained first measurement. For example, control unit 210 may send a control signal to analog receiver voltage variable attenuator 212 to adjust the signal measured at first branch directional coupler 246 to the predetermined level.

After control unit 210 adjusts the first component to get the first signal to the predetermined level at the plurality of ports based on the obtained first measurement in stage 330, method 300 may proceed to stage 340 where node 110 may combine a second signal with the first signal. For example, second headend communication line 155 may provide remote physical layer circuit 208 with a digital optical signal from headend 105. Remote physical layer circuit 208 may convert the received digital optical signal into an analog electrical signal and the feed this signal to remote physical layer circuit voltage variable attenuator 214. With second switch 218 in the closed position, this second signal may be combined with the first signal at combiner 220 and distributed to plurality of branches 230 via splitter 228 and provided to the plurality of ports (e.g., first port 248, second port 258, third port 268, and fourth port 278).

Once node 110 combines the second signal with the first signal in stage 340, method 300 may continue to stage 350 where node 110 may obtain a second measurement of the output at the first one of the plurality of ports. For example, first branch directional coupler 246 (or any of the branch directional couplers) may sample the output and send this sample to control unit 210. In this way, control unit 210 may be provided with a level value of the second signal.

After node 110 obtains the second measurement of the output at the first one of the plurality of ports in stage 350, method 300 may proceed to stage 360 where control unit 210 may adjust a second component to get the second signal to the predetermined level at the plurality of ports based on the obtained second measurement. For example, control unit 210 may send a control signal to remote physical layer circuit voltage variable attenuator 214 to adjust the signal measured at first branch directional coupler 246 to the predetermined level. In this way, the output from analog receiver 206 and remote physical layer circuit 208 may be adjusted to the same level at the plurality of ports. Once control unit 210 adjusts the second component to get the second signal to the predetermined level at the plurality of ports based on the obtained second measurement in stage 360, method 300 may then end at stage 370.

Figure 4:
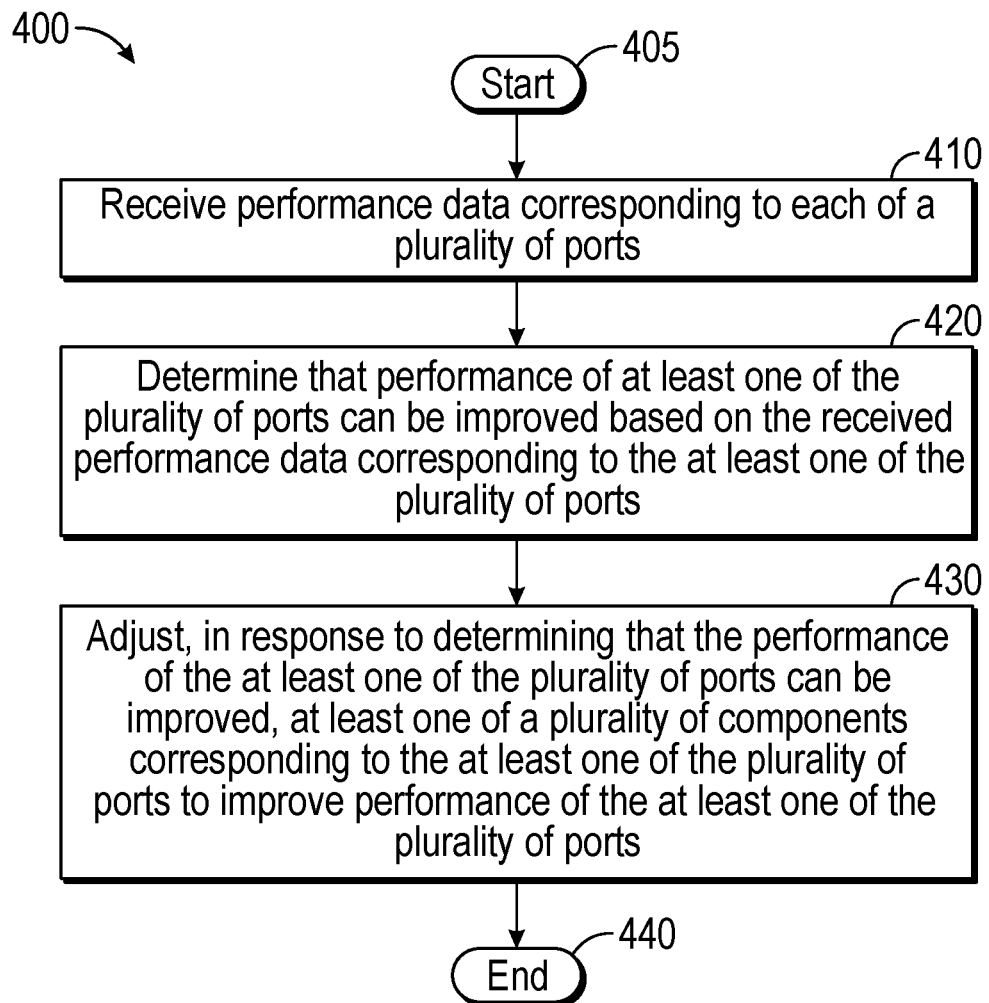
FIG. 4 is a flow chart of a method for providing per-port performance optimization.

FIG. 4 is a flow chart setting forth the general stages involved in a method 400 consistent with embodiments of the disclosure for providing per-port performance optimization. Method 400 may be implemented using node 110 as described in more detail above with respect to FIG. 2. Ways to implement the stages of method 400 will be described in greater detail below.

Method 400 may begin at starting block 405 and proceed to stage 410 where control unit 210 may receive performance data corresponding to each of the plurality of ports. For example, the performance data may comprise, but is not limited to, modulation error ratio (MER) and/or bit error rate (BER). For each of the plurality of ports, the performance data may be respectively obtained from first branch directional coupler 246, second branch directional coupler 256, third branch directional coupler 266, and fourth branch directional coupler 276 for example. Furthermore, for each of the plurality of ports, the performance data may be respectively obtained from first customer premises equipment 130, second customer premises equipment 135, third customer premises equipment 140, and fourth customer premises equipment 145. Because each of the plurality of node communication lines 125 may vary in length, the performance data for each of the each of the plurality of ports may be different.

From stage 410, where control unit 210 receives the performance data, method 400 may advance to stage 420 where control unit 210 may determine that the performance of at least one of the plurality of ports can be improved based on the received performance data corresponding to the at least one of the plurality of ports. For example, optimizing node output tilt setting may be provided. Assume node 110, after power up, has default values as output level=58 dBmV @ 1218 MHz and output tilt=22 dB (54-1218 MHz). The MER performance of the channels selected to measure at node 110's output (e.g. one of the plurality of ports) may have, for example, certain high frequency channels that are operating above a performance threshold, but the MER of the low frequency channels on that same output may be operating below a performance threshold. When node control unit 210 gets the MER data measured at both node output and CPE, it may determine that it is the tilt on the corresponding branch being set too high that may be causing the poor MER performance for those low band channels. Accordingly, control unit 210 may adjust the tilt, for example, to 18 dB and reduce the level to 57.2 dBmV to get satisfactory performance across the entire band.

In another example, node output level setting may be optimized. When control unit 210 senses that the MER performance at node output, for example, may be below a threshold while the serving CPEs may be getting a relatively high input level, control unit 210 may determine that it is the output power level that is set too high causing the unsatisfied node performance. Accordingly control unit 210 may adjust down the power level (e.g., by 1 dB) so that node 110's MER performance may be improved.

In yet another example, assume node 110, after power up, has default values as output level=58 dBmV @ 1218 MHz and output tilt=22 dB (54-1218 MHz). The MER performance for the channels selected to measure at node output and at CPE may both be above a predetermined threshold. However, the input levels of all CPE's may consistently appear high. With that margin in the input levels to serving CPE's, the power of node can be reduced by adjusting to a lower bias current for the output gain-block. When the input level to the serving CPEs gets reduced due to the temperature variation in the cable (i.e. node communication line), control unit 210 may adjust output levels back to get a relatively consistent input level to the serving CPEs.

Once control unit 210 determines that the performance of the at least one of the plurality of ports can be improved based on the received performance data corresponding to the at least one of the plurality of ports in stage 420, method 400 may continue to stage 430 where control unit 210 may adjust, in response to determining that the performance of the at least one of the plurality of ports can be improved, at least one of a plurality of components corresponding to the at least one of the plurality of ports to improve performance of the at least one of the plurality of ports. For example, control unit 210 may adjust the at least one of a plurality of components comprising, for example, voltage variable equalizers and voltage variable attenuator in each of the plurality of branches 230 to effect a desired performance change on each of the corresponding plurality of ports. Once node 110 adjusts the at least one of a plurality of components in stage 430, method 400 may then end at stage 440.

Figure 5:
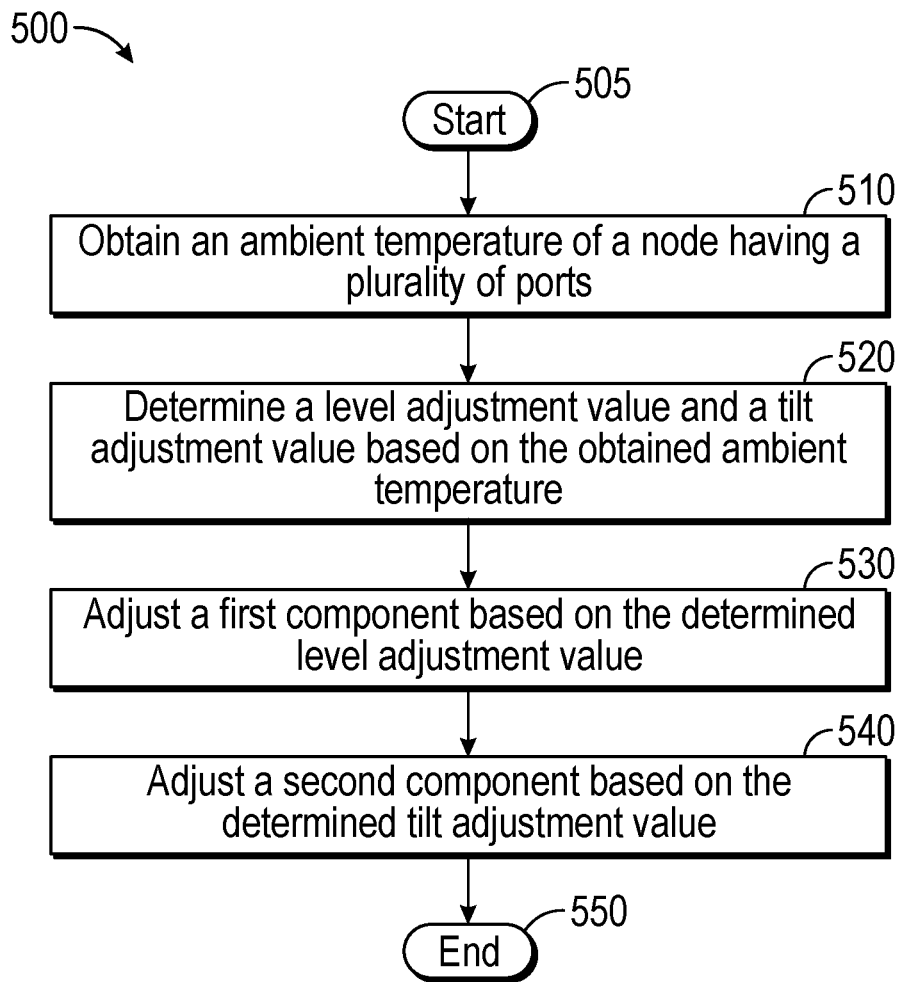
FIG. 5 is a flow chart of a method for providing thermal compensation.

FIG. 5 is a flow chart setting forth the general stages involved in a method 500 consistent with embodiments of the disclosure for providing thermal compensation. Method 500 may be implemented using node 110 as described in more detail above with respect to FIG. 2. Ways to implement the stages of method 500 will be described in greater detail below.

Method 500 may begin at starting block 505 and proceed to stage 510 where control unit 210 may obtain an ambient temperature inside node 110. For example, temperature transducer 280 may periodically measure the ambient temperature inside node 110 and periodically transmit the measured temperature to control unit 210.

From stage 510, where control unit 210 obtains the ambient temperature of node 110, method 500 may advance to stage 520 where control unit 210 may determine a level adjustment value and a tilt adjustment value based on the obtained ambient temperature. For example, control unit 210 may send an inquiry to a lookup table to obtain a thermal compensation (e.g., LUT_TC) comprising the level adjustment value and the tilt adjustment value based on the obtained ambient temperature.

Once control unit 210 determines the level adjustment value and the tilt adjustment value based on the obtained ambient temperature in stage 520, method 500 may continue to stage 530 where control unit 210 may adjust a first component based on the determined level adjustment value. For example, adjusting the first component may comprise adjusting analog receiver voltage variable attenuator 212 and/or remote physical layer circuit voltage variable attenuator 214 to get a relatively constant output level over the temperature changes in node 110. Furthermore, first branch voltage variable attenuator 242, second branch voltage variable attenuator 252, third branch voltage variable attenuator 262, and fourth branch voltage variable attenuator 272 may be adjusted for fine adjustments to each of plurality of branches 230 respectively. In this way thermal variations in level (e.g., amplitude) may be compensated for according to data from the lookup table.

After control unit 210 adjusts the first component based on the determined level adjustment value in stage 530, method 500 may proceed to stage 540 where control unit 210 may adjust a second component based on the determined tilt adjustment value. For example, the second component may comprise any one or more of first branch voltage variable equalizer 240, second branch voltage variable equalizer 250, third branch voltage variable equalizer 260, and fourth branch voltage variable equalizer 270. In this way thermal variations in tilt may be compensated for according to data from the lookup table. Once control unit 210 adjusts the second component based on the determined tilt adjustment value in stage 540, method 500 may then end at stage 550. Method 500 may be repeated periodically (e.g., hourly, daily, weekly, monthly, etc.) In this way, node 110 may be adjusted to compensate for annual or diurnal temperature changes for example.

Figure 6:
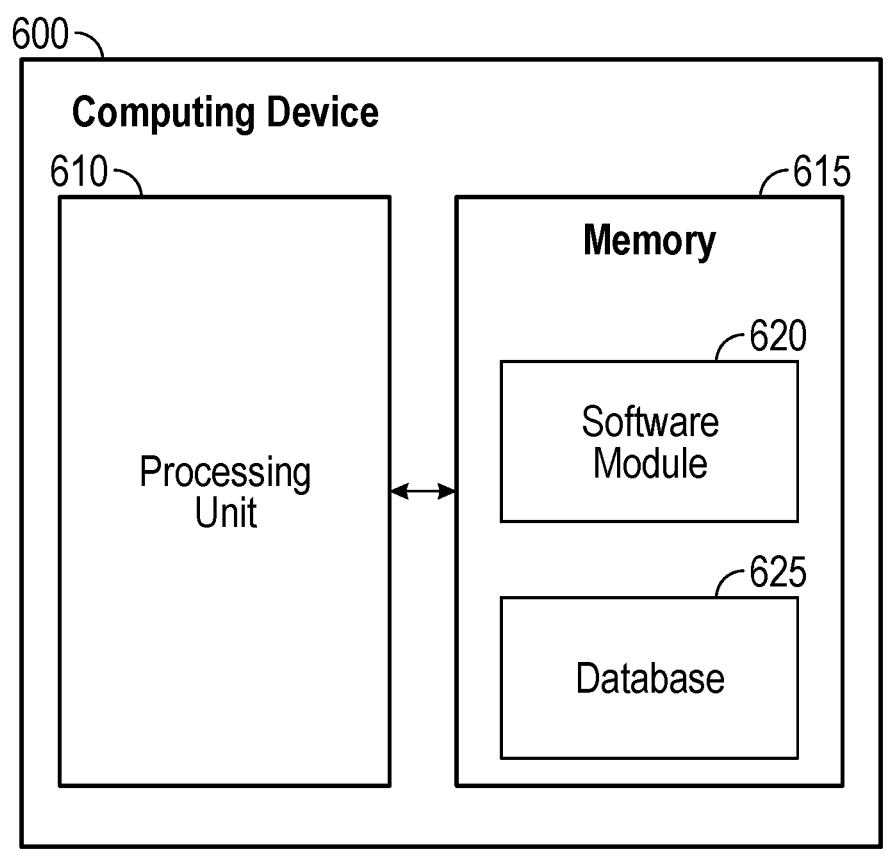
FIG. 6 is a block diagram of a computing device.

FIG. 6 shows computing device 600. As shown in FIG. 6, computing device 600 may include a processing unit 610 and a memory unit 615. Memory unit 615 may include a software module 620 and a database 625. Database 625 may comprise and/or include, but is not limited to, the lookup table. While executing on processing unit 610, software module 620 may perform, for example, processes for providing input level alignment, processes for providing per-port performance optimization, and processes for providing thermal compensation, including for example, any one or more of the stages from method 300 described above with respect to FIG. 3, any one or more of the stages from method 400 described above with respect to FIG. 4, or any one or more of the stages from method 500 described above with respect to FIG. 5. Computing device 600, for example, may provide an operating environment for control unit 210. Control unit 210 may operate in other environments and is not limited to computing device 600.

Computing device 600 may be implemented using a personal computer, a network computer, a mainframe, a router, or other similar microcomputer-based device. Computing device 600 may comprise any computer operating environment, such as hand-held devices, multiprocessor systems, microprocessor-based or programmable sender electronic devices, minicomputers, mainframe computers, and the like. Computing device 600 may also be practiced in distributed computing environments where tasks are performed by remote processing devices. The aforementioned systems and devices are examples and computing device 600 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Moreover, the semantic data consistent with embodiments of the disclosure may be analyzed without being stored. In this case, in-line data mining techniques may be used as data traffic passes through, for example, a caching server or network router. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in FIG. 2 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 500 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   obtaining an ambient temperature of a node having an optical interface and a plurality of ports;
   determining a level adjustment value and a tilt adjustment value based on the obtained ambient temperature;
   adjusting a first component based on the determined level adjustment value, wherein adjusting the first component comprises adjusting an analog receiver voltage variable attenuator and a remote physical layer circuit voltage variable attenuator based on the determined level adjustment value; and
   adjusting a second component based on the determined tilt adjustment value, wherein adjusting the first component comprises adjusting a voltage variable equalizer configured to affect only one of the plurality of ports based on the determined tilt adjustment value, and
   wherein adjusting the analog receiver voltage variable attenuator and the remote physical layer circuit voltage variable attenuator based on the determined level adjustment value comprises adjusting the analog receiver voltage variable attenuator and the remote physical layer circuit voltage variable attenuator to get a substantially constant output level over temperature change in the node.

2. The method of claim 1, wherein obtaining the ambient temperature of the node comprises obtaining the ambient temperature from a temperature transducer disposed inside the node.

3. The method of claim 1, wherein determining the level adjustment value and the tilt adjustment value comprises determining the level adjustment value and the tilt adjustment value from a lookup table.

4. The method of claim 1, wherein adjusting the first component further comprises adjusting at least one of a plurality of branch voltage variable attenuators configured to affect at least two of the plurality of ports.

5. The method of claim 1, wherein adjusting the first component further comprises adjusting at least one of a plurality of branch voltage variable attenuators configured to affect only one of the plurality of ports.

6. The method of claim 1, further comprising repeating the method periodically.

7. A system comprising:
   a memory storage; and
   a processing unit coupled to the memory storage, wherein the processing unit is operative to:
   obtain an ambient temperature of a node having an optical interface and a plurality of ports;
   determine a level adjustment value and a tilt adjustment value based on the obtained ambient temperature;
   adjust a first component based on the determined level adjustment value, wherein the processing unit being operative to adjust the first component comprises the processing unit being operative to adjust an analog receiver voltage variable attenuator and a remote physical layer circuit voltage variable attenuator based on the determined level adjustment value; and
   adjust a second component based on the determined tilt adjustment value, wherein the processing unit being operative to adjust the first component comprises the processing unit being operative to adjust a voltage variable equalizer configured to affect only one of the plurality of ports based on the determined tilt adjustment value, and
   wherein the processing unit being operative to adjust the analog receiver voltage variable attenuator and the remote physical layer circuit voltage variable attenuator based on the determined level adjustment value comprises the processing unit being operative to adjust the analog receiver voltage variable attenuator and the remote physical layer circuit voltage variable attenuator to get a substantially constant output level over temperature change in the node.

8. The system of claim 7, wherein the processing unit being operative to obtain the ambient temperature of the node comprises the processing unit being operative to obtain the ambient temperature from a temperature transducer disposed inside the node.

9. The system of claim 7, wherein the processing unit being operative to determine the level adjustment value and the tilt adjustment value comprises the processing unit being operative to determine the level adjustment value and the tilt adjustment value from a lookup table.

10. The system of claim 7, wherein the processing unit being operative to adjust the first component comprises the processing unit being operative to adjust the first component comprising a voltage variable attenuator configured to affect at least two of the plurality of ports.

11. The system of claim 7, wherein the processing unit being operative to adjust the first component further comprises the processing unit being operative to adjust at least one of a plurality of branch voltage variable attenuators configured to affect only one of the plurality of ports.

12. A non-transitory computer-readable medium that stores a set of instructions which when executed perform a method, the method executed by the set of instructions comprising:
   obtaining an ambient temperature of a node having an optical interface and a plurality of ports;
   determining a level adjustment value and a tilt adjustment value based on the obtained ambient temperature;
   adjusting a first component based on the determined level adjustment value, wherein adjusting the first component comprises adjusting an analog receiver voltage variable attenuator and a remote physical layer circuit voltage variable attenuator based on the determined level adjustment value; and
   adjusting a second component based on the determined tilt adjustment value, wherein adjusting the first component comprises adjusting a voltage variable equalizer configured to affect only one of the plurality of ports based on the determined tilt adjustment value, and
   wherein adjusting the analog receiver voltage variable attenuator and the remote physical layer circuit voltage variable attenuator based on the determined level adjustment value comprises adjusting the analog receiver voltage variable attenuator and the remote physical layer circuit voltage variable attenuator to get a substantially constant output level over temperature change in the node.

13. The non-transitory computer-readable medium of claim 12, wherein obtaining the ambient temperature of the node comprises obtaining the ambient temperature from a temperature transducer disposed inside the node.

14. The non-transitory computer-readable medium of claim 12, wherein determining the level adjustment value and the tilt adjustment value comprises determining the level adjustment value and the tilt adjustment value from a lookup table.

15. The non-transitory computer-readable medium of claim 12, wherein adjusting the first component further comprises adjusting at least one of a plurality of branch voltage variable attenuators configured to affect at least two of the plurality of ports.

16. The non-transitory computer-readable medium of claim 12, wherein adjusting the second component comprises adjusting the second component comprising a voltage variable equalizer configured to affect only one of the plurality of ports.

17. The non-transitory computer-readable medium of claim 12, further comprising repeating the method periodically.

* * * * *